(12) United States Patent
Chatterjee (10) Patent No.: US 6,549,675 B2
(45) Date of Patent: Apr. 15, 2003

(54) COMPRESSION OF DIGITAL INK (75) Inventor: Manjirnath Chatterjee, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 143 days.

(21) Appl. No.: 09/741,992

(22) Filed: Dec. 20, 2000

(65) Prior Publication Data

US 2002/0110281 A1 Aug. 15, 2002

(51) Int. Cl.$^7$ .............................. G06K 9/00; G06K 9/36; G06K 9/46
(52) U.S. Cl. ................. 382/244; 382/246; 382/119; 382/187; 382/232; 382/233; 382/235; 382/245
(58) Field of Search ................................ 382/119, 183, 382/187, 232, 233, 244, 245, 246; 345/433; 348/699

(56) References Cited

U.S. PATENT DOCUMENTS

| 5,392,447 | A | * | 2/1995 | Schlack et al. | ............. 382/245 |
|---|---|---|---|---|---|
| 5,610,995 | A | * | 3/1997 | Zheng et al. | ............... 382/183 |
| 5,696,563 | A | * | 12/1997 | Rosenberg | ................... 348/699 |
| 5,751,860 | A | * | 5/1998 | Su et al. | ..................... 382/244 |
| 5,920,647 | A | | 7/1999 | Nowlan et al. | |
| 5,926,567 | A | * | 7/1999 | Collins et al. | .............. 382/187 |
| 6,011,873 | A | * | 1/2000 | Desai et al. | ................. 382/245 |
| 6,373,411 | B1 | | 4/2002 | Shoham | |
| 6,373,974 | B2 | * | 4/2002 | Zeng | .......................... 382/135 |

* cited by examiner

Primary Examiner—Phuoc Tran
Assistant Examiner—Amir Alavi
(74) Attorney, Agent, or Firm—Hisashi D. Watanabe (57) ABSTRACT

Compression of digital ink is achieved by calculating second order differences between consecutive elements in the digital ink and applying the differences to a Huffman encoder to produce a compressed bitstream. For digital ink that is not highly correlated, compression may be achieved by representing segments of the digital ink by mathematical shapes such as a Bezier curve or orthogonal elements and transmitting the shape instead of the digital ink.

26 Claims, 7 Drawing Sheets

COMPRESSION OF DIGITAL INK

FIELD OF THE INVENTION

The present invention is directed to methods and apparatus for compression of digital information, for uses such as digital ink and electronic images, as well as more generalized compression and reconstruction applications.

BACKGROUND OF THE INVENTION

Figure 1:
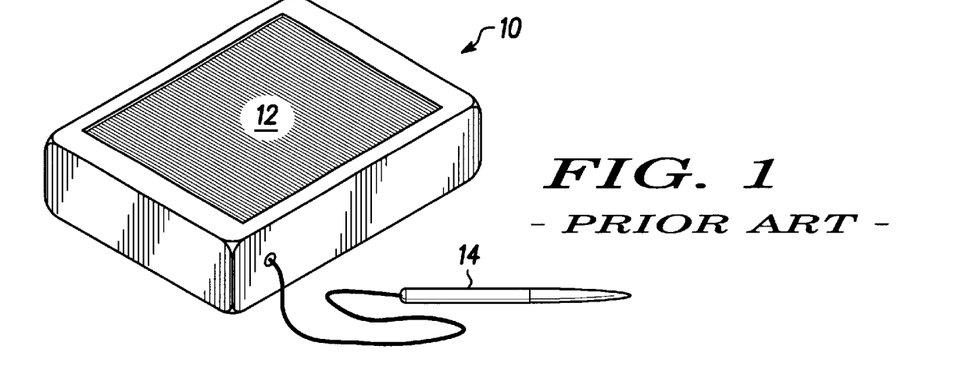
FIG. 1 is a block diagram of a prior art pen-based computer system.

Recently, there has been an explosion in the market for very small computer devices that are highly portable, pocketable or even wearable. Entering textual information into these devices, however, is a challenge. Because of their small size, many of these devices cannot support a full keyboard. A natural way to enter information into such a small device is by using an electronic digitizer such as a pen or stylus to write data directly on the display of the computer. A small computer that interprets handwriting input via a pen is often referred to as a "pen-based" computer. As shown in FIG. 1, a pen-based computer system 10 includes a display 12 and a writing instrument, such as a pen 14 or stylus. A user can input information by "writing" directly on the display 12. In a typical pen-based computer system 10, the user touches the pen 14 to the display 12 and writes as if on a piece of paper—that is, by making a series of pen strokes to form letters, words, drawings or other patterns. A resulting line or curve appears on the display 12, following the path of travel of the pen point so that the pen strokes appear on the display 12 as digital "ink" just as handwritten ink would appear on a notebook page. Thus, by digital ink, it is meant the dynamic trace produced by the user when using a writing device to enter information into a computer device, such as a pen-based computer. A pen-based computer system 10 may capture digital ink in the form of one or more strokes. A stroke is a line or curve between the point where the tip of the stylus makes contact with the writing surface and the point where the tip of the stylus leaves the writing surface. Typically, the pen based computer system 10 digitizes the position of pen 14 or stylus as a function of time to create a digital ink vector.

Figure 2:
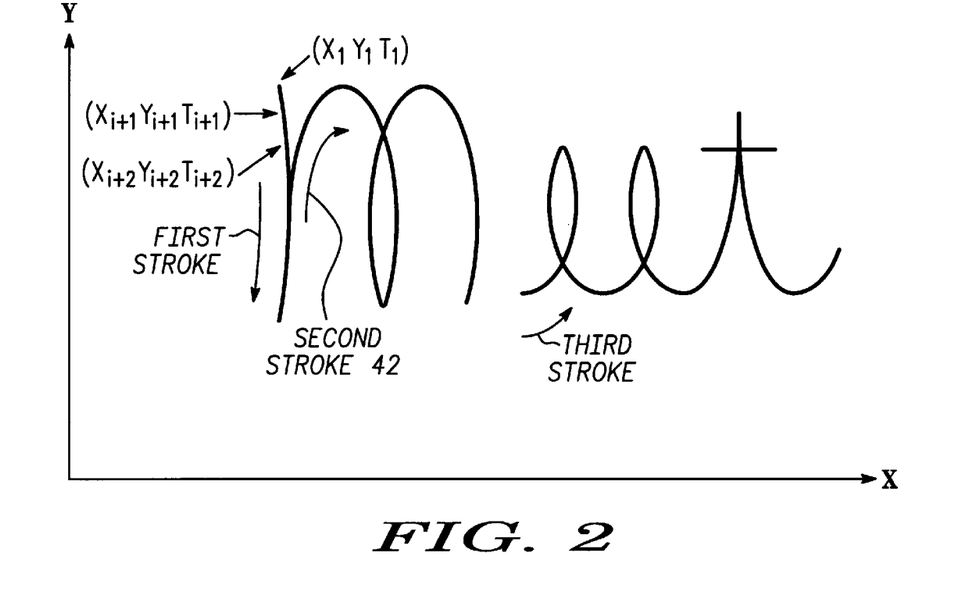
FIG. 2 depicts a letter in digital ink, showing strokes and points.

The pen-based computer system 10 typically samples points along each handwritten stroke at a predetermined sampling frequency. Pen-based computer systems may typically sample handwritten data at a rate of up to 200 sampled points per second. If the computer sampling rate is constant, the number of sampled points along a stroke varies inversely with the speed with which the graphic data is handwritten: the faster the handwriting, the fewer the number of sampled points along the stroke; and the slower the handwriting, the greater the number of sampled points along the stroke. Further, the higher the sampling rate, the greater the number of sampled points per stroke, and the lower the sampling rate, the fewer the number of samples points per stroke. For example, at a sampling rate of 100 points per second, stroke 42 in FIG. 2 contains 1000 sampled points if it takes the user one second to write. A typical page of digital ink may contain hundreds of strokes and tens of thousands of sampled points.

Figure 3:
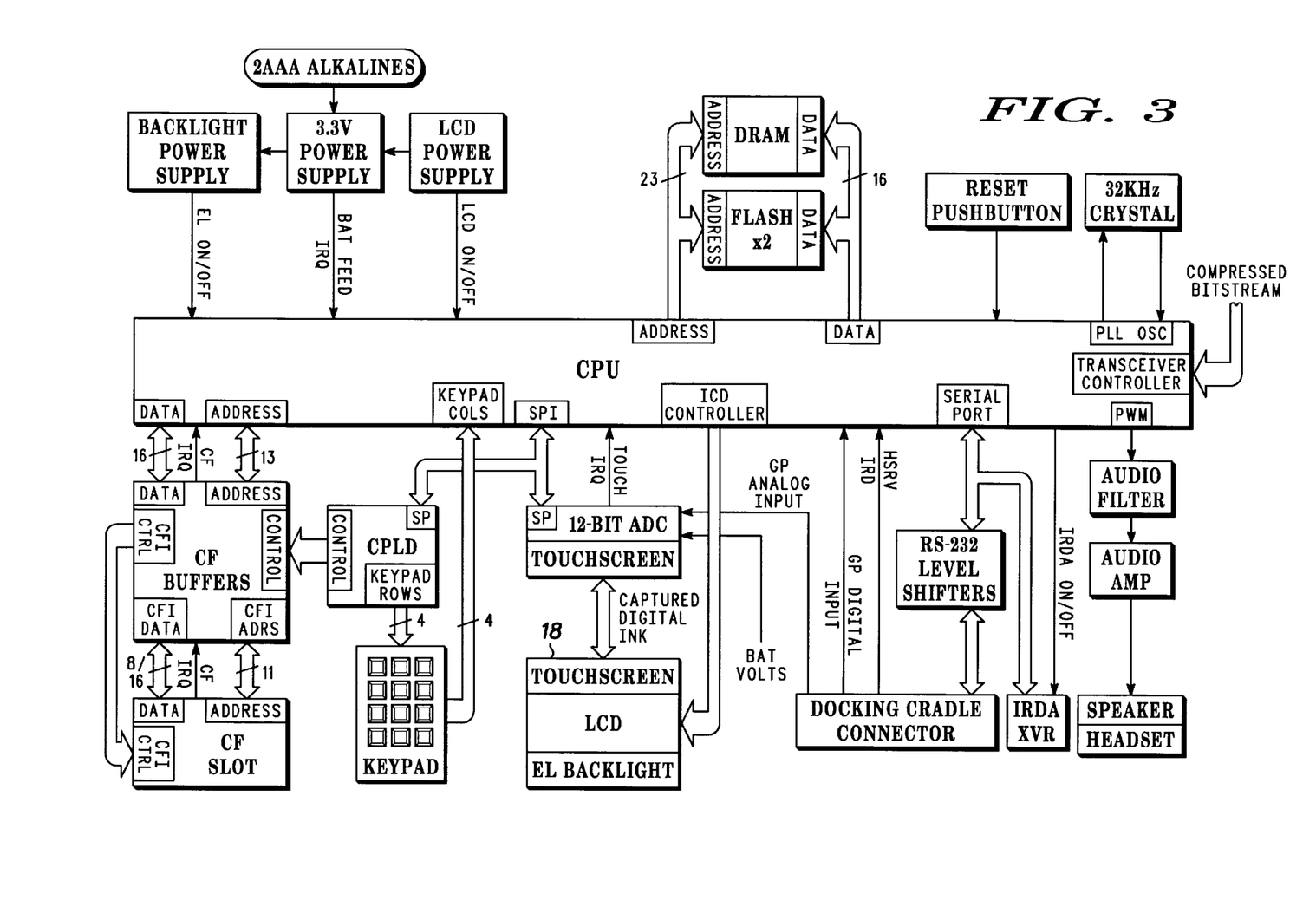
FIG. 3 is a block diagram of a system architecture of a pen-based computer system, according to an illustrative embodiment of the present invention.

The pen-based computer system 10 includes a central processing unit (CPU) that receives the sampled points as a data stream and stores the points in memory, such as dynamic random access memory (DRAM) as shown in FIG. 3. The points may be further processed by software routines stored in flash memory as shown in FIG. 3. Further, the pen-based computer system is often wirelessly connected to a host computer system such that the digital ink may be transmitted from the pen-based computer 10 to the remote computer. If the digital ink is transmitted as generated by the pen-based computer 10, then a large number of sampled points need to be transferred. For example, in uncompressed form, the 1000 sampled points of stroke 42 in FIG. 2 comprises 4000 bytes, where each point is represented as 4 bytes.

A particular problem with having such large data streams is that the memory storage requirements are large. Being able to compress the digital ink allows for less memory to be utilized in the pen-based computer system. This in turn, allows for the pen-based computer system to be designed and manufactured smaller. Thus, it would be desirable for a pen-based computer system to store digital ink efficiently and thus operate free of excessive memory. Another problem with large data streams is that it takes longer to transmit to a remote computer, particularly when using low-bandwidth communication channels such as wireless modems. Generally, transferring digital ink or other image data across a wireless link may take a significant amount of time, which becomes a "bottleneck", or limiting factor for the system performance. Waiting for the system fully render and transfer the ink may impede or interrupt the user's work flow or train of thought, or may be simply frustrating and irritating to the user. Thus, it would be desirable for a pen-based computer system to transmit digital ink efficiently and thus operate more quickly.

To reduce the size of the data stream, pen-based computers may perform compression on the sampled points of the digital ink to compactly represent the data. It is known in the art to store compression software in a pen-based computer system and have the CPU execute the software to perform compression of the data stream. If the digital ink when captured by the display takes X bytes of storage in Cartesian or vector coordinates, compression will reduce the X bytes to $C*X$ bytes where $C<1$. C represents the compression ratio, or amount of compression performed by the compression software. Thus, if $C=0.50$, then a captured digital ink of 1000 bytes may be reduced to 500 bytes by performing compression on the captured data stream.

The compressed data stream will eventually be decompressed, perhaps by decompression software executed by the remote computer. Ideally, the decompressed data stream will be the same as the captured data stream. If it is the same, then the compression routine is termed "lossless compression;" that is, the compression involved no loss of information. However, if the decompressed data stream is different, even slightly different, than the captured data stream, the compression routine is termed "lossy compression." Some information was "lost" during compression and so the captured data stream could not be recovered exactly.

Some applications require that the compression be performed losslessly. For example, a pen-based computer used in commercial transactions may require that signatures transmitted to facilitate credit card payments be transmitted losslessly. Understandably, a merchant and customer may demand that signature verification be performed with the highest respect for integrity of the data stream and that no information be lost during compression. In contrast, the transmission of animated cartoons may be performed in a lossy manner. Even though the original data stream is not faithfully recovered or extracted, the user of the pen-based computer may not care and may tolerate the loss of information.

U.S. Pat. No. 6,011,873 to Desai, et al. (Penware, Inc.) describes a compression algorithm for lossless compression of signature data. The Desai algorithm computes the differential between consecutive points in a data stream to achieve compression. This algorithm discards duplicate data points and achieves some compression of the captured data stream for certain types of digital ink. Only discarding duplicate data points and only taking the differential between consecutive points limits the amount of compression that is achieved. If the consecutive points in the data stream are not highly correlated (e.g., such as with jittery handwritten lines, computer images or graphic animations), then using the Desai algorithm to perform compression produces a compressed data stream which is not optimally compressed, and may even be larger than the captured data stream.

Improved compression systems and methods would be desirable, particularly for very small portable devices that carry out compression of digital ink. Accordingly, particularly for very small portable devices such as pen-based computer systems, and other hand held appliances that utilize compression, there is a need for efficient new systems for compression of digital ink.

Various aspects of the invention are described in more detail in the following Drawings and Detailed Description of the Invention.

DETAILED DESCRIPTION OF THE INVENTION

Generally, the present invention is for methods and apparatus for substantially lossless compression of digital ink. In one aspect, substantially lossless compression of digital ink is performed by subdividing strokes in the digital ink stream into points that are separated into arrays. Consecutive points in the arrays are used to compute a second order difference which is applied to a Huffman encoder to achieve compression of the digital ink stream. Further, in another aspect, compression of digital ink may also include the decompression of the compressed digital ink. Various aspects of the present invention can be implemented in either hardware or software, or both.

Figure 4:
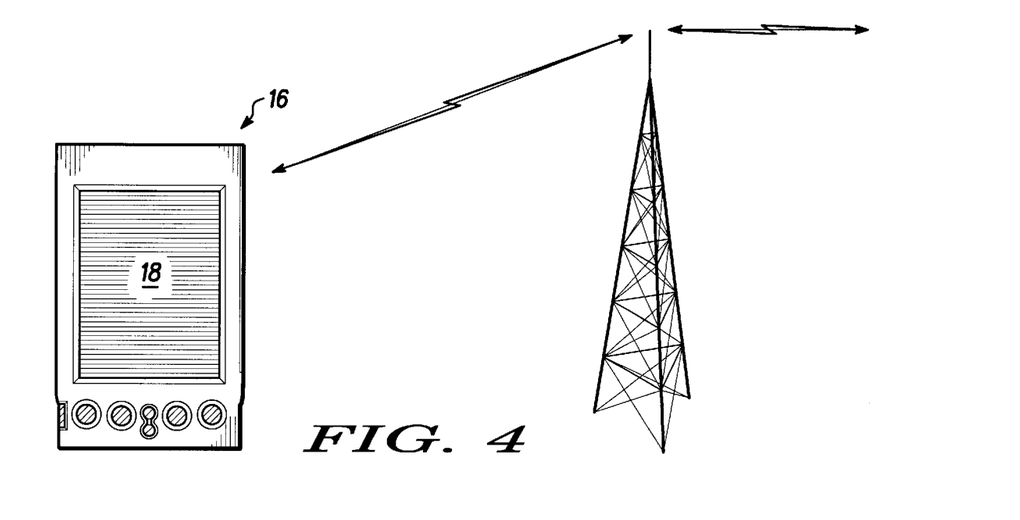
FIG. 4 is a system level diagram of the pen-based computer system of FIG. 3.

The compression scheme of the present invention may be employed and incorporated into various computer systems, for example, a handheld computer sold under the trademark PALM VII™ 16 as shown in FIG. 4. A PALM VII™ handheld computer 16 functions as an organizer of information and allows for input of handwritten information from a touchscreen liquid crystal display (LCD) 18. In addition, a PALM VII™ handheld computer 16 allows for communication with a remote computer across a wireless link 20. Although the compression scheme is described with reference to the PALM VII™ handheld computer 16, other wireless communication devices such as a cellular telephone may benefit from an embodiment of the invention. Further, the compression scheme of the present invention may be performed on a desktop computer with a cathode ray tube (CRT) display or equivalent computer and associated hardware.

Referring now to FIG. 3, there is shown a simplified architecture of the PALM VII™ handheld computer 16. The PALM VII™ handheld computer 16 typically includes a central processing unit (CPU), main memory such as dynamic random access memory (DRAM), flash memory, a power supply, a speaker, a display 18, a keypad, and associated control circuitry. Additionally, the PALM VII™ handheld computer 16 includes a pen or stylus (not shown in FIG. 3). In previously known handheld computers, the writing instrument has been a stylus or pen; however, the writing instrument is not limited and may be any other input device such as a mouse, track-ball, pointer, or even a user's fingers. In addition, computer systems capable of accepting handwritten data are not necessarily limited to receiving data generated by human users. For example, machine-generated data may also be inputted into and accepted by such systems.

Typically, a PALM VII™ includes a LCD display that provides X-bit resolution, e.g. 380×280 pixels. The display is coupled to a pen which allows for user input to the device and the PALM VII™ captures the user input at a sampling rate of approximately X pixels/second. The sampling rate may vary depending upon applications running on the PALM VII™. For example, for a digital signature application, the sampling rate may be Y pixels/second whereas for a calendar application, the sampling rate may be less than that.

The PALM VII™ handheld computer 16 includes a transceiver for communicating with a remote computer. The CPU performs compression of digital ink from the LCD and decompression of digital ink from a remote computer for display on the LCD. The transceiver interfaces with the CPU to send and receive digital ink from a remote computer. In summary, the CPU reads the captured data from the LCD and generates a compressed bitstream that represents the captured data. The CPU applies a sequence of compression steps to reduce the number of bits used to represent the captured data. The resulting compressed bitstream is then output to the transceiver and may be transmitted to a remote computer or stored in memory for later transmittal. Further, those skilled in the art will understand that, in an alternative embodiment, the captured data may be stored offline and that compression may be part of subsequent non real-time processing.

Figure 5:
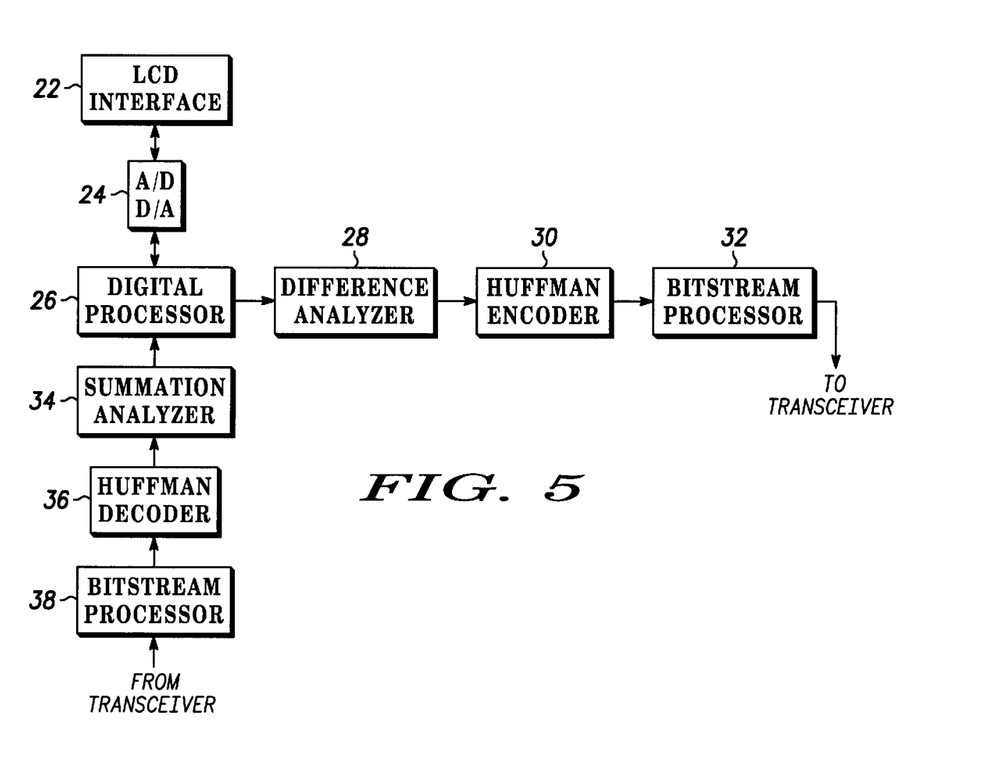
FIG. 5 is a functional diagram of compression and decompression processing implemented by the CPU of FIG. 3.

Referring now to FIG. 5, there is shown a simplified functional diagram for compression and decompression performed by the CPU shown in FIG. 3. As mentioned in the background, compression and decompression is generally performed by software executed on the CPU of the pen-based computer system 6. The software as a whole is generally called a "CODEC," short for COmpressor DECompressor. In an illustrative embodiment, compression of digital ink is performed by a LCD interface 22, an analog to digital converter (ADC) 24, a digital processor 26, a difference analyzer 28, a Huffman encoder 30, and a bitstream processor 32.

The LCD interface 22 functions to capture data received from the display 18 when a user writes on the touchscreen with a pen. As a user writes, pressure sensitive sensors within the display 18 respond to user-drawn positions of the pen. The display 18 provides raw 12-bit pixel resolution, e.g. 4096×4096 pixels. Thus, X-axis and Y-axis coordinate values of points within the captured data may vary from 0 to 4096. Although the compression scheme is described with reference to X-axis and Y-axis coordinate values for points within the captured digital ink, the digital ink may also be described with reference to an additional coordinate value representing time. For example, in another embodiment, X-axis, Y-axis, and T-axis (where T represents a time-value) coordinate values for points within the captured digital ink may represent the digital ink. The additional time value coordinate may be useful for applications such as digital signature verification, animated cartoons and dynamic images. In addition, digital ink may be represented by other coordinate systems such as latitude and longitude meridians, or radius vector and angle.

The ADC 24 functions to convert the captured digital ink into digital form. The ADC 24 converts the analog pen position to the X-axis and Y-axis coordinates of the display. For example, the first point in the captured digital ink may be represented as having coordinates ($X_i$, $Y_i$). The next consecutive point in the captured digital ink stream will have coordinates ($X_{i+1}$, $Y_{i+1}$). Since these points do not necessarily coincide, the second point may be referenced to the first point in terms of a differential distance such as ($X_{i+1}-X_i$, $Y_{i+1}-Y_i$). The ADC may be any suitable means for digitizing analog captured signals.

The digital processor 26 functions to separate the X-axis and Y-axis coordinates of the points into two arrays. One array holds all the X-axis coordinates and the other array holds all the Y-axis coordinates. For example, the X-array will contain the points ($X_i$, $X_{i+1}$, $X_{i+2}$, ..., $X_j$ where j is a number from 0 to the last point in the captured digital ink stream). The Y-array will contain the points ($Y_i$, $Y_{i+1}$, $Y_{i+2}$, ..., $Y_j$ where j is a number from 0 to the last point in the captured digital ink stream). In addition, digital processor (Block 26) computes the maximum number of bits that are useful for representing the first two points in the array, where:

maximum number of bits to store $X_1$=ceiling($\log_2(X_1)$)+sign($X_1$)

maximum number of bits to store $X_2$=ceiling($\log_2(X_2)$)+sign($X_2$)

The same calculation is performed for the first two points in the Y-array. Difference analyzer 28 computes calculation of the subsequent points in each array.

The difference analyzer 28 functions to compute the offset between consecutive points. Performing difference analysis on consecutive points in each array achieves compression because there is a high correlation between consecutive points. The points in each stroke are not randomly distributed on the display but are highly ordered. For example, handwriting consists of lines and smooth curves, which implies that consecutive points are fairly close to each other. For example, for a line, consecutive points will vary by a factor of one because each point is a constant number of pixels away in the x and y direction. For smooth curves, consecutive points may vary by a factor of three because successive points in a stroke will be highly correlated. Thus, the probability density function for the difference between consecutive points will be between a small range of values, say for example between plus or minus three. The difference between consecutive points can be computed as follows and is termed "first order difference":

$$X_\Delta = X_{i+1} - X_i$$

$$Y_\Delta = Y_{i+1} - Y_i$$

Performing compression research on digital ink has shown that taking the difference between consecutive first order differences (termed "second order difference") is even more correlated than the first order difference. Finding the second order differences ($X_{2\Delta}$) can be found as follows:

$$X_{\Delta 1} = X_{i+1} - X_i$$

$$X_{\Delta 2} = X_{i+2} - X_{i+1}$$

$$X_{2\Delta} = X_{\Delta 2} - X_{\Delta 1}$$

$$= X_{i+2} - X_{i+1} - X_{i+1} + X_i$$

$$= X_{i+2} - 2X_{i+1} + X_i$$

The same computation is also performed for the Y-axis points and yields the following:

$$Y_{2\Delta} = Y_{\Delta 2} - Y_{\Delta 1}$$

$$= Y_{i+2} - 2Y_{i+1} + Y_i$$

After computing the second order differences for the X-axis points and the Y-axis points, the results are input to a Huffman encoder 30. The Huffman encoder 30 functions to generate a histogram of the occurrences of the second order differences for the X-axis and Y-axis data and to use the histogram to efficiently encode the second order differences so that a minimum number of bits are used to represent the second order differences. At the output of the Huffman encoder 30 is the encoded bitstream that represents the compressed captured digital ink. Those skilled in the art will understand that any suitable integer entropy encoder may be used in place of the Huffman encoder. For example, an arithmetic encoder may be used and is more optimal than the Huffman encoder for streaming applications where the captured bitstream is not unknown a priori.

Finally, the bitstream processor 32 functions to encapsulate the compressed bitstream into a data frame comprising the version number of the compression scheme and other information useful for reconstructing the digital ink. Information such as the type of compression performed may be useful to reconstruct the digital ink after it has been transmitted to a remote computer. Those skilled in the art will understand that the encoded digital ink bitstream may be transmitted using any suitable means of transmission such as telephone line, RF antenna, local area network, or wide area network.

The operation of decompression will now be described. Decompression is the reverse of compression. Decompression of digital ink involves a bitstream processor 38, a Huffman decoder 36, a summation analyzer 34, a digital processor 26, a digital to analog converter (DAC) 24, and a LCD interface 22.

First, the compressed bitstream is received by the transceiver from a remote computer. The bitstream processor 38 functions to enlarge the data received from a remote computer into information including the compressed bitstream and the version number. The version number is used to determine what type of compression scheme was used to perform the compression and accordingly must be used to perform decompression. Next, the compressed bitstream is fed into the Huffman decoder 36 to map the compressed bitstream into X and Y decoded second order difference components. Then, the X and Y decoded second order difference components are summed into X-axis and Y-axis points where the summation analyzer 34 performs the following computation:

$$X_{i+2} = X_{2\Delta} + 2X_{i+1} - X_i$$

$$Y_{i+2} = Y_{2\Delta} + 2Y_{i+1} - Y_i$$

The digital processor 26 functions to take the points in the X-axis and Y-axis arrays and assemble the ordered pairs of (Xi, Yi) data. The DAC 24 functions to take the ordered pairs of (Xi, Yi) data and convert to analog pen positions. The LCD interface 22 functions to display the analog pen positions on the user's touchscreen display.

In an illustrative embodiment, the compression and decompression operations of FIG. 4 are performed in one system, namely the codec running on the CPU of FIG. 3. In an alternative embodiment of the present invention, two distinct systems comprising all of the different components of the codec may be used to compress and decompress digital ink. Those skilled in the art will understand that both systems may be used to compress and decompress digital ink images off-line instead of in real-time.

Figure 6:
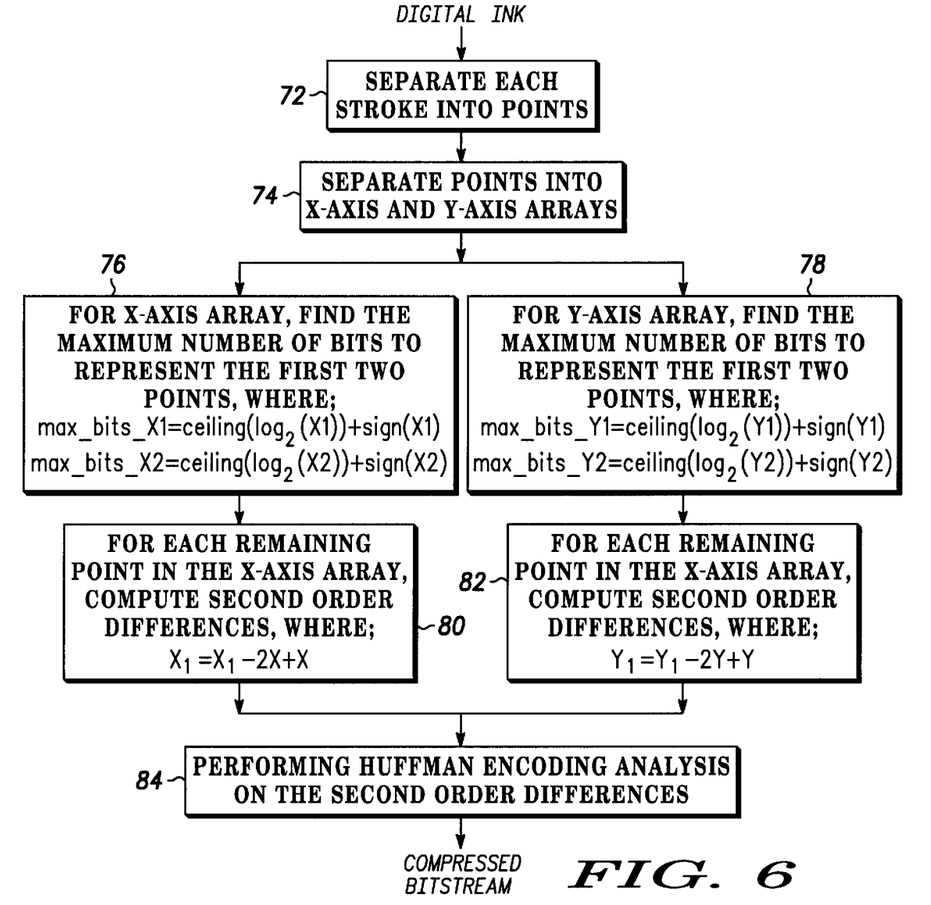
FIG. 6 is a flow diagram of a compression method implemented by the system of FIG. 3.

Referring now to FIG. 6, there is shown a block diagram of a method for compressing digital ink, according to an illustrative embodiment of the present invention. Further, the compression method is described as a lossless compression method since the captured digital ink stream is compressed without loss of information. The lossless compression method computes a second order difference for consecutive points in a digital ink stroke and performs Huffman analysis to compress the second order differences. Specifically, the lossless compression method comprises the steps of (a) separating each stroke in the digital ink into points (Block 72), (b) separating each point into X-axis and Y-axis arrays (Block 74), (c) calculating the maximum number of bits to represent the first two points in the X-axis and Y-axis arrays (Blocks 76, 78), (d) calculating second order differences for each remaining point in the X-axis and Y-axis arrays (Blocks 80, 82), and (e) performing Huffman encoding analysis on the second order differences (Block 84).

In accordance with the present invention, the lossless compression method may be carried out by general purpose computer systems, and/or by specialized digital signal processors (DSPs), (ASICs) or other specialized digital (or analog) logic systems. In an illustrative embodiment, the lossless compression method is preferably implemented in by the codec of FIG. 4. As an example of a programmed general purpose computer system implementation, the following program may use a programmed general purpose computer system, such as that based on a Motorola M*CORE™ microprocessor based system. In this regard, the following C program generates C code output for the lossless compression of digital ink. The C program allocates memory for the digital ink (termed "pBitStream" in the program), subdivides strokes into points, separates points into X-axis and Y-axis arrays, computes the second order differences of consecutive points, encodes the second order differences, and writes the result to the bitstream object. The C function "LxS_Compress_HuffmanCompressTo BitStream" (code not shown) performs the Huffman encoding for the second order differences array, "pData":

```
typedef signed long      s32;
typedef unsigned long    u32;
typedef signed short     s16;
typedef unsigned short   u16;
typedef signed char      s8;
typedef unsigned char    u8;
typedef struct
{
    s16    x;
    s16    y;
}LxS_InkPoint;
typedef struct
{
    LxS_InkPoint   *mpPoints;      /* array of points     */
    u16                            mNumPoints;   /* number of points */
    u16                            mColorTag;    /* color of object  */
}LxS_InkStroke;
typedef struct
{
    LxS_InkStroke  **mppStrokes;
    u16                            mNumStrokes;
}LxS_Ink;
{
    Write_Header ();
    s16* pData = 0;
    u32 k = 0;
    u32 num_els = 0;
    /* in this loop we find out the number of bits necessary to represent
*/
    /* the startx starty and num points per stroke
*/
    snum2 = npInk->mNumStrokes;
    NumBitsForNSxSy = 1;
    for (i = 0; i < npInk->mNumStrokes; i++)
    {
```

```
                snum = (npInk->mppStrokes [i] ->mNumPoints);
                snum = LxS_Abs (snum);
                snum2 = (snum>snum2) ? snum:snum2;
                snum = (npInk->mppStrokes [i] ->mpPoints [0] .x);
                snum = LxS_Abs (snum);
                snum2 = (snum>snum2) ? snum:snum2;
                snum = (npInk->mppStrokes [i] ->mpPoints [0] .y);
                snum = LxS_Abs (snum);
                snum2 = (snum>snum2) ? snum:snum2;
        }
        NumBitsForNSxSy = MaxBitsToRepresent (snum2);
        /* this is the number of bits for sx, sy, n */
        LxS_BitStream_PutNBitQty (pBitStream, NumBitsForNSxSy, 5);
        unum = npInk->mNumStrokes;
        LxS_Bitstream_PutNBitQty (pBitStream, unum, NumBitsForNSxSy);
        /* num strokes */
        for (i = 0; i < npInk->mNumStrokes; i++)
        {
                snum = (npInk->mppStrokes [i] ->mNumPoints);
                LxS_Bitstream_PutNBitQty (pBitStream, snum, NumBitsForNSxSy);
                snum = (npInk->mppStrokes [i] ->mpPoints [0] .x);
                LxS_Bitstream_PutNBitQty (pBitStream, snum, NumBitsForNSxSy);
                snum = (npInk->mppstrokes [i] ->mpPoints [0] .y);
                LxS_BitStream_PutNBitQty (pBitStream, snum, NumBitsForNSxSy);
        }
        for (i = 0; i < npInk->mNumStrokes; i++)
        {
                if (npInk->mppStrokes [i] ->mNumPoints >=2 )
                        num_els += ((npInk->mppStrokes [i] ->mNumPoints-1) <<1);
        }
        if (num_els > 0)
                pData = LxS_malloc (sizsof (s16) *num_els);
        if (pData)
        {
                for (i = 0; i < npInk->mNumStrokes; i++)
                {
                        if (npink->mppstrokes [i] ->mNumPoints > 1)
                                pData [k++] = npInk->mppStrokes [i]-
>mpPoints [1] .x -
                                npInk->mppStrokes [i] ->mpPoints [0] .x;
                        for (j = 2; j < npInk->mppStrokes [i] ->mNumPoints; j++)
                                pData [k++] = npInk->mppStrokes [i] -
>mpPoints [j] .x -
                                ((npInk->mppStrokes [i] ->mpPoints [j-1] .x) <<1) +
                                npInk->mppStrokes [i] ->mpPoints [j-2] .x;
                }
                for (i = 0; i < npInk->mNumStrokes; i++)
                {
                        if (npInk->mppStrokes [i] ->mNumPoints > 1)
                                pData [k++] = npInk->mppStrokes [i] -
>mpPoints [1] .y -
                                pInk->mppStrokes [i] ->mpPoints [0] .y;
                        for (j = 2; j < npInk->mppStrokes [i] ->mNumPoints; j++)
                                pData [k++] = npInk->mppStrokes [i] -
>mpPoints [j] .y-
                                ((npInk->mppStrokes [i] ->mpPoints [j-1] .y) <<1)+
                                npInk->mppStrokes [i] ->mppoints [j-2) .y;
                }
                LxS_Compress_HuffmanCompressToBitStream (pData, k, pBitStream);
                LxS_free (pData);
        }
} /* LxS_CODEC_PURE_HUFFMAN_DIFF_2PASS */
```

Each stroke comprises a vector of points. Each point is either a double or triple dimensional array. In an illustrative embodiment, where a point is a double dimensional array, a point represents an x and y coordinate. As mentioned previously, in another embodiment, a point may be a three dimensional array where a point represents X-axis, Y-axis, and T-axis coordinate values. Those skilled in the art will understand that the present invention may be implemented with different types of vector differences.

As mentioned earlier, the lossless compression method implemented on the CPU of FIG. 3 computes the second order differences to the digital ink sequence to generate a compressed bitstream. Those skilled in the art will understand that the present invention may be implemented with two computations, one to compute the first order differences and the second for calculating the second order differences, as follows:

$$X_{\Delta 1}=X_{i+1}-X_i, X_{\Delta 2}=X_{i+2}-X_{i+1} \quad\quad 1.$$

$$X_{2\Delta}=X_{\Delta 2}-X_{\Delta 1} \quad\quad 2.$$

It will also be understood that the digital ink sequences encoded using the present invention may include anything from a single digital ink stroke (or even part of a single stroke) up to an arbitrarily large number of strokes.

Moreover, the present invention may be used to compress each digital ink sequence of a number of digital ink sequences contained in a single digital ink stream, where each digital ink sequence represents a fixed number of strokes or where each digital ink sequence corresponds to an image containing similar digital ink strokes. Those skilled in the art will understand that the present invention can be used in other processing applications that rely on signal differences to represent signals that are representative of or constituting handwriting.

Table 1 compares compression using the present invention to previous compression techniques used by Motorola for pen-based computer systems. In Table 1, column one lists the name of the figure and column two lists the uncompressed size of the figure in column one. Columns three and four list the number of strokes and points in the figure in column one. Columns five and six represent the size of the compressed file using two compression schemes. Column seven represents the size of the compressed file using the lossless compression scheme described in this application. Column five describes Codec 1 which performs compression by computing the first order differences and encoding the differences. For FIG. 8, the captured data stream is 2520 bytes and encoding the first order differences produces a compressed data stream which is 782 bytes. Column six describes Codec 2 which performs compression by computing the first order differences, inputting the differences into a Huffman encoder, and encoding the output of the Huffman encoder. For FIG. 9, the captured data stream is 6112 bytes and encoding the first order differences plus using a Huffman encoder produces a compressed data stream which is 1125 bytes. Column seven describes Codec 3 which performs compression by computing the second order differences, inputting the second order differences into a Huffman encoder, and encoding the output of the Huffman encoder, as in an embodiment of the present invention. Note this is the most efficient of all the three compression schemes. For FIG. 10, the captured data stream is 6548 bytes and encoding the second order differences plus using a Huffman encoder produces a compressed data stream which is 1088 bytes. Codec 3 effectively reduces FIG. 10 approximately six times its original size.

TABLE 1

Figure 8:
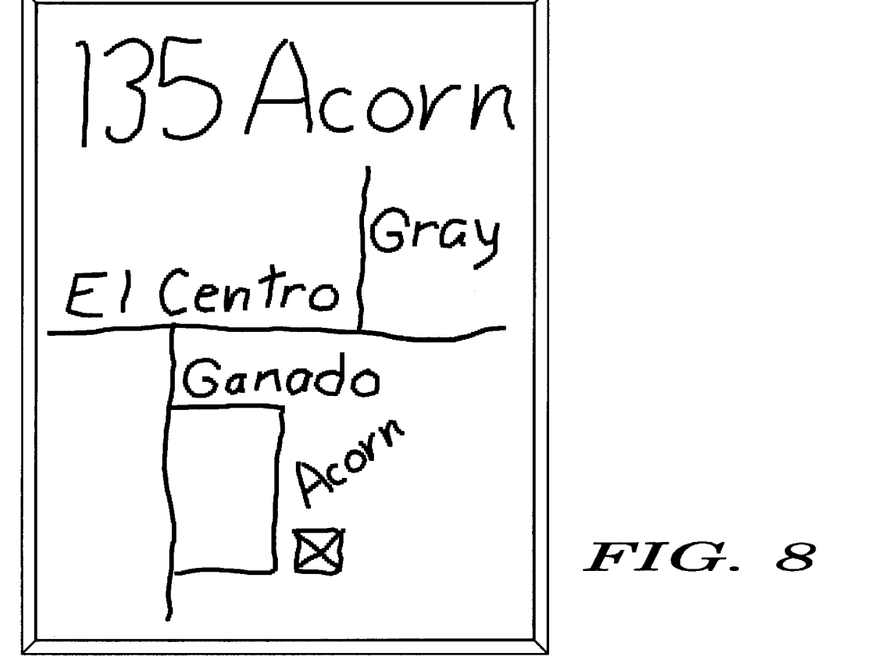
FIG. 8 depicts a first handwritten digital ink sample.
Figure 9:
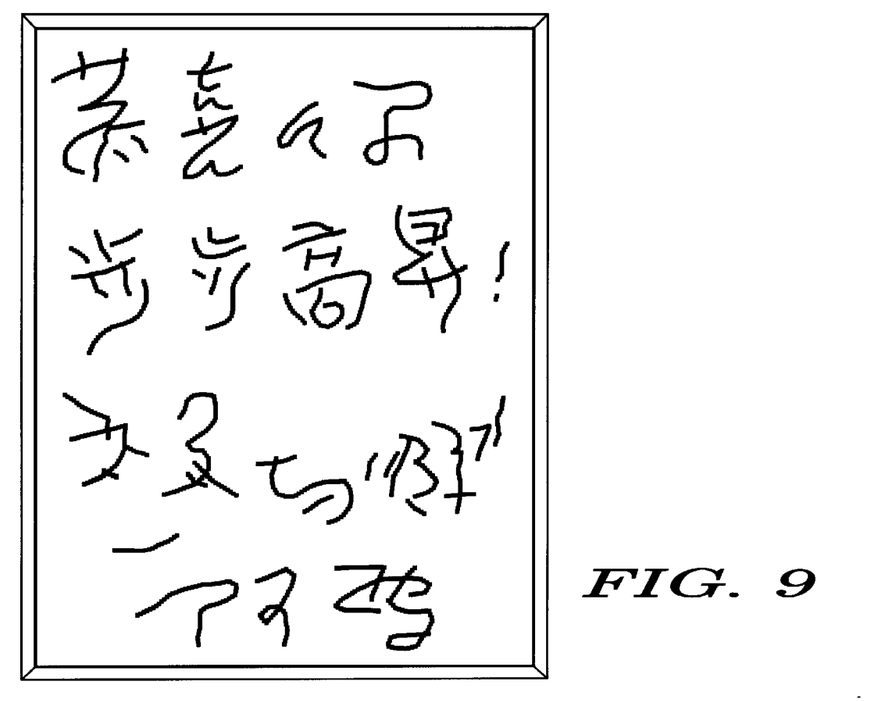
FIG. 9 depicts a second handwritten digital ink sample.
Figure 10:
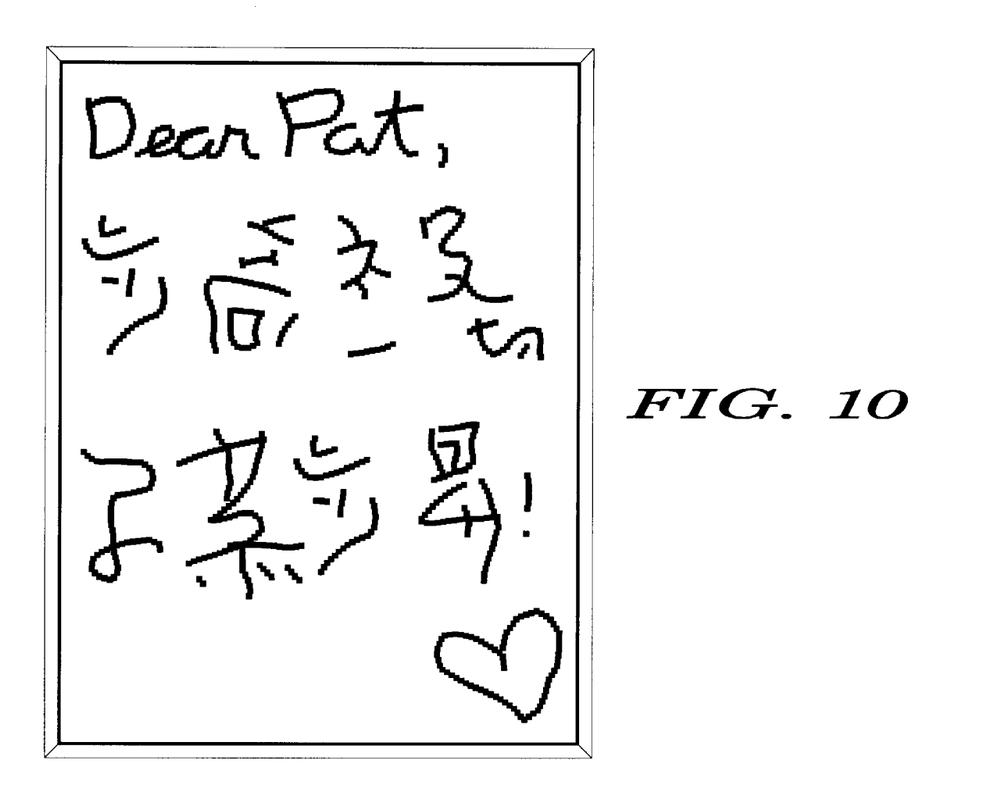
FIG. 10 depicts a third handwritten digital ink sample.

| Figure | Bytes | Strokes | Points | Codec 1 | Codec 2 | Codec 3 |
| --- | --- | --- | --- | --- | --- | --- |
| FIG. 8 | 2520 | 45 | 538 | 782 | 524 | 454 |
| FIG. 9 | 6112 | 83 | 1360 | 1890 | 1125 | 1060 |
| FIG. 10 | 6548 | 79 | 1477 | 2028 | 1222 | 1088 |

Figure 7:
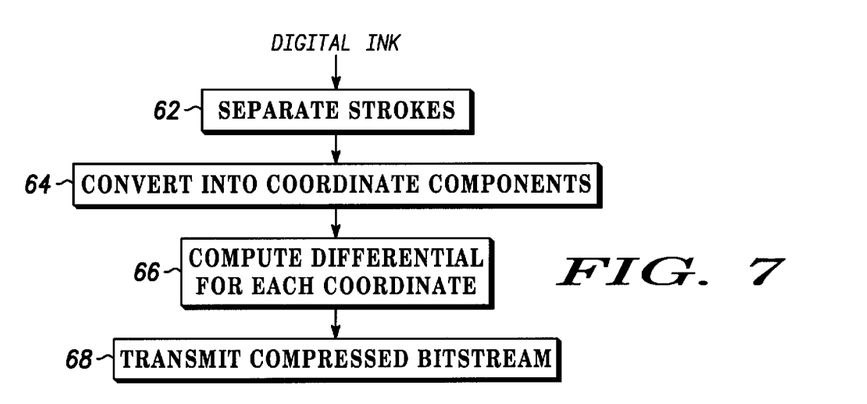
FIG. 7 is a flow diagram of a compression method implemented by the system of FIG. 3.

Referring now to FIG. 7, there is shown a block diagram of another method for lossless compression of digital ink, according to an illustrative embodiment of the present invention. The lossless compression method compresses digital ink captured by the PALM VII™ handheld computer 16 of FIG. 3. The lossless compression method implements a multi-differential digital ink compression scheme. That is, the method computes multiple differentials, e.g. the difference between consecutive points of the captured digital ink (termed "first order differences"), the difference of the differences (termed "second order differences"), and so on. With each order of differences, the method generates data used in one or more subsequent difference calculations. In particular, the method preferably computes the second order differences of the captured digital ink.

In accordance with the present invention, a method for compressing digital ink comprising the steps of (a) separating digital ink strokes into points (Block 62); (b) converting the points into coordinate components (Block 64); (c) computing a differential for consecutive points in each coordinate component (Block 66); and (d) transmitting the differential representing the compressed digital ink (Block 68) is described.

The step of computing a differential functions to find highly correlated points in the digital ink strokes such that encoding the difference between consecutive points is more efficient than transmitting the digital ink as captured. Further, the step of computing a differential may be iteratively performed. In an illustrative embodiment, the step of computing a differential comprises the following two steps: (a) computing a first differential for consecutive points in each coordinate component and (b) computing at least one more differential from the first differential in each coordinate component. As mentioned before, the sampled data was compressed by finding the second order difference between consecutive points; however, if the captured data stream is even more highly correlated, then computing a third order difference may produce an even more highly compressed digital ink stream. In such a situation, the first three data points are useful to reconstruct the original digital ink stream and need to be transmitted.

Figure 11:
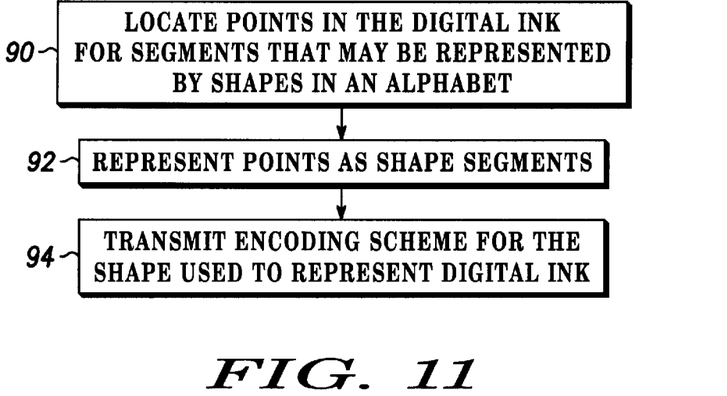
FIG. 11 is a functional diagram of an alternative compression scheme performed by the CPU of FIG. 3.

For digital ink that is not highly correlated, the above described lossless compression schemes may not compress the captured data stream. For such situations, the compression scheme shown in FIG. 11 may be used. A substantially lossless compression method comprising the steps of (a) locating points in digital ink for segments that may be represented by shapes in an alphabet (Block 90); (b) representing points as shape segments (Block 92), and (c) transmitting the representation of the shape used to represent the points in the digital ink (Block 94). In the compression scheme of FIG. 11, substantially lossless is defined such that the information lost in compression may be less than the sampling error or on the order of magnitude of the sampling error. For example, if the sampling rate is X, then the method of FIG. 11 may be substantially lossless if the amount of information lost during compression is on the order of X. For purposes of this invention, substantially lossless means that upon compression and decompression, the sampling error of the PALM VII™ is within the sampling rate of the instrument. Further, there may be different kinds of error for different kinds of segments.

Figure 12:
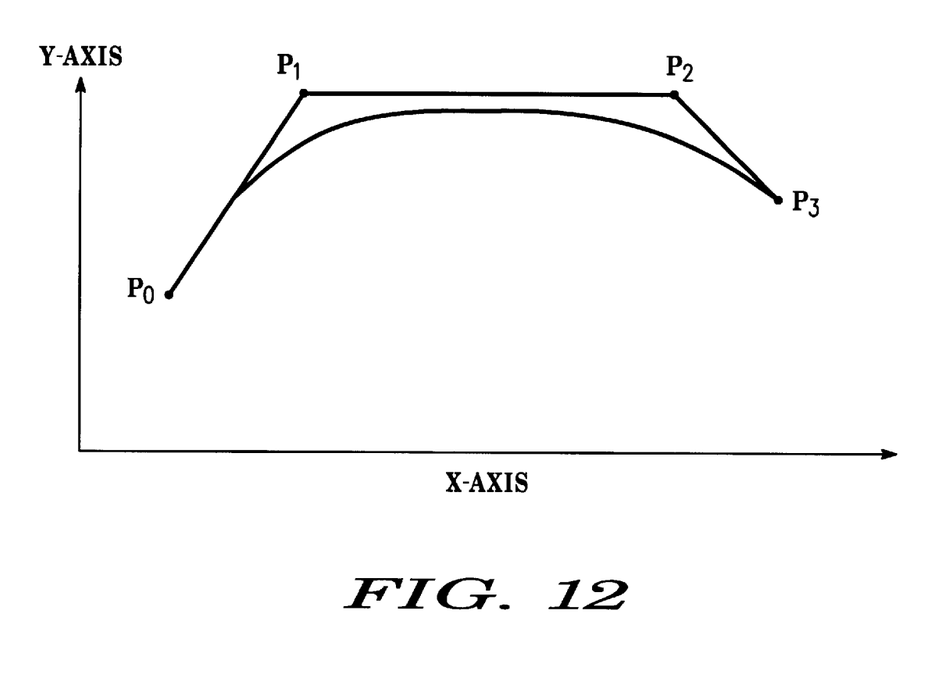
FIG. 12 depicts a digital ink segment substituted by a Bezier curve.

The step of locating points in the digital ink for segments that may be represented by shapes in an alphabet requires testing a stream of points to determine whether the segment containing those points may be represented by a predefined shape. A shape includes objects such as polygons, ellipses, rectangles, and Bezier curves. The next step of representing points as shape segments requires replacing a stream of points by a representation of the shape. For example, in FIG. 12 a digital ink stroke is shown which may be represented by a Bezier curve defined by the equation as follows:

$$B_3(t) = (1-t)^3 P_0 + 3t(1-t)^2 P_1 + 3t^2(1-t) P_2 + t^3 P_3$$

Thus, the step of representing the digital ink stroke shown in FIG. 12 requires replacing the stream of points which are connected by $P_0$, $P_1$, $P_2$, and $P_3$ and substituting the Bezier curve that is define by the above equation. Compression is achieved by substituting the stream of points connected by $P_0$, $P_1$, $P_2$, and $P_3$ with the four points $P_0$, $P_1$, $P_2$, and $P_3$ and notation identifying the stroke as a Bezier curve. Finally, the points $P_0$, $P_1$, $P_2$, and $P_3$ and the notation are transmitted to the remote computer. Using this type of compression, the original digital ink is transmitted with loss of information thus the compression is termed "substantially lossless." Substantially lossless compression may be appropriate for applications such as animated cartoons or dynamic images where an exact duplicate of the original digital ink may not be necessary. Further, such applications may require a quick transfer of digital ink that such a compression scheme yields.

In another illustrative embodiment, compression of digital ink may be achieved by resampling the digital ink, transmitting the resampled digital ink and sampling rate. Compression is achieved by reducing the original digital ink stream. For example, by resampling at a rate of 50%, a digital ink stream of 1000 bytes may be reduced to 500 bytes. Effectively, every other point in the digital ink stream is transmitted.

In another illustrative embodiment, using any combination of the above schemes may perform compression of digital ink. That is, compression may be achieved by finding differentials between consecutive points, representing segments by shapes in an alphabet and resampling, or any combination of the above techniques.

The present invention may be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the present invention has been described with respect to various specific embodiments and examples, it will be appreciated that a wide variety of modifications, adaptations and derivations may be made which are within the spirit and scope of the present invention as defined by the following claims and equivalents thereof.

What is claimed is:

1. A method for lossless compression of digital ink, comprising the steps of:
    (a) subdividing digital ink comprising a plurality of digital ink strokes into digital ink points comprising coordinates;
    (b) separating the digital ink points comprising coordinates into separate coordinate arrays comprising array elements;
    (c) computing second order differences between consecutive array elements in each coordinate array; and
    (d) applying the second order differences to a Huffman encoder to generate a compressed bitstream.

2. The method of claim 1 wherein the coordinates are X-axis and Y-axis values representing coordinates of a display.

3. The method of claim 2 wherein the coordinates further include a time value representing a moment in time when the point was entered on the display.

4. The method of claim 1 wherein the step of separating further comprises the steps of:

obtaining a X-axis coordinate for each digital ink point and storing the X-axis coordinate in a X-axis coordinate array; and obtaining a Y-axis coordinate for each digital ink point and storing the Y-axis coordinate in a Y-axis coordinate array.

5. The method of claim 4 further comprising the step of obtaining a T-axis coordinate for each digital ink point and storing the T-axis coordinate in a T-axis coordinate array.

6. The method of claim 1 wherein the step of computing second order differences further comprises the steps of:
    (a) subtracting consecutive elements in each coordinate array to calculate a first order difference;
    (b) storing each first order difference in an array of first order differences comprising array elements; and
    (c) subtracting consecutive elements in the array of first order differences to calculate a second order difference.

7. The method of claim 6 wherein the coordinate array comprises X-axis, Y-axis, and T-axis elements.

8. The method of claim 1 wherein the step of computing second order differences further comprises the steps of:
    (a) computing the maximum number of bits to store the first two elements in each coordinate array;
    (b) obtaining three consecutive elements, termed A, B, and C, in each coordinate array;
    (c) computing a second order difference from the equation C−2B+A from the three consecutive elements; and
    (d) collecting the maximum number of bits to store the first two elements and the second order difference.

9. The method of claim 8 wherein the coordinates include X-axis, Y-axis, and T-axis elements.

10. The method of claim 1 wherein the step of subdividing further comprises the steps of:
    (a) locating points in digital ink for segments that may be represented by shapes in an alphabet;
    (b) representing the points as shape segments; and
    (c) transmitting the representation of the shape used to represent the points in the digital ink.

11. A method for lossless decompression of digital ink, comprising the steps of:
    (a) applying a compressed bitstream to a Huffman decoder to generate second order differences;
    (b) computing consecutive array elements from the second order differences;
    (c) combining array elements to form digital ink points; and
    (d) joining the digital ink points to form digital ink comprising a plurality of digital ink strokes.

12. The method of claim 11 wherein the digital ink points are represented by X-axis and Y-axis coordinates representing coordinates of a display.

13. The method of claim 12 wherein the digital ink points further include a time coordinate representing a moment in time when the point was entered on the display.

14. The method of claim 11 wherein the step of computing consecutive array elements further comprises the steps of:
    (d) adding consecutive second order differences to calculate first order differences; and
    (e) adding consecutive first order differences to calculate consecutive array elements.

15. The method of claim 11 wherein the step of combining further comprises the steps of obtaining an array element from an array of X-axis coordinates and obtaining an array element from an array of Y-axis coordinates to form a digital ink point comprising coordinates.

16. The method of claim 15 further comprising the step of obtaining an array element from an array of T-axis coordinates to form a digital ink point comprising a time value.

17. A method for lossless compression of digital ink, comprising the steps of:
   (a) separating each stroke in the digital ink into digital ink points;
   (b) separating each digital ink point into X-axis and Y-axis elements;
   (c) collating each X-axis element into an X-axis array and collating each Y-axis element into a Y-axis array;
   (d) calculating the maximum number of bits to represent the first two elements in the X-axis and Y-axis arrays, respectively;
   (e) calculating second order differences for each remaining element in the X-axis and Y-axis arrays, respectively; and
   (f) applying the second order differences to a Huffman encoder to generate a compressed bitstream.

18. A method for lossless decompression of digital ink, comprising the steps of:
   (a) applying a compressed bitstream to a Huffman decoder to generate second order differences;
   (b) calculating X-axis and Y-axis array elements for X-axis and Y-axis arrays, respectively;
   (c) separating X-axis and Y-axis elements into X-axis and Y-axis arrays, respectively;
   (d) combining X-axis and Y-axis elements into digital ink points; and
   (e) combining digital ink points into digital ink strokes.

19. A device for compression of digital ink, comprising:
   (a) a display interface comprising capture means for retrieving digital ink;
   (b) an analog to digital converter that translates captured digital ink into digital ink points comprising coordinates;
   (c) a digital processor which separates the coordinates into coordinate arrays
   (d) a difference analyzer to compute the offset between coordinates in each coordinate array to produce second order differences; and
   (e) a Huffman encoder generating a histogram of occurrences of the second order differences to produce an encoded bitstream.

20. The device of claim 19 wherein the coordinates are X-axis and Y-axis values representing coordinates of a display.

21. The device of claim 19 wherein the coordinates further include a time value representing a moment in time when the point was entered on the display.

22. The device of 19 further includes a bitstream processor that encapsulates the encoded bitstream into a data packet for transmitting to a remote computer.

23. A device for decompression of digital ink, comprising:
   (a) a Huffman decoder which takes an encoded bitstream to produce a histogram of occurrences of second order differences;
   (b) a summation analyzer to compute coordinates from the second order differences;
   (c) a digital processor to form digital ink comprising coordinates;
   (d) a digital to analog converter that translates digital ink comprising coordinates into digital ink points; and
   (e) a display interface comprising means for presenting the digital ink points on a display.

24. The device of claim 23 wherein the coordinates are X-axis and Y-axis values representing coordinates of a display.

25. The device of claim 23 wherein the coordinates further include a time value representing a moment in time when the point was entered on the display.

26. The device of 23 further includes a bitstream processor that retrieves an encoded bitstream with compressed digital ink from a remote computer.

* * * * *